(12) United States Patent
Huang et al.

(10) Patent No.: US 12,493,147 B2
(45) Date of Patent: Dec. 9, 2025

(54) CONTINUOUSLY FORMED OPTICAL FIBER WITH DIFFERENT CORE PROFILE ZONES

(71) Applicant: Ortronics, Inc., New London, CT (US)

(72) Inventors: Lei Huang, Glastonbury, CT (US); Daniel M. Smith, Westerly, RI (US)

(73) Assignee: Legrand DPC, LLC, Ringgold, VA (US)

( * ) Notice: Subject to any disclaimer, the term of this patent is extended or adjusted under 35 U.S.C. 154(b) by 243 days.

(21) Appl. No.: 17/211,451

(22) Filed: Mar. 24, 2021

(65) Prior Publication Data

US 2021/0302647 A1    Sep. 30, 2021

Related U.S. Application Data

(63) Continuation-in-part of application No. 16/390,582, filed on Apr. 22, 2019.
(Continued)

(51) Int. Cl.
*G02B 6/02* (2006.01)
*B29D 11/00* (2006.01)
(Continued)

(52) U.S. Cl.
CPC .... *G02B 6/02042* (2013.01); *B29D 11/00721* (2013.01); *B33Y 80/00* (2014.12);
(Continued)

(58) Field of Classification Search
CPC ............ C03B 2203/18; C03B 2205/13; C03B 37/02763; C03B 2203/10; C03B 37/0124;
(Continued)

(56) References Cited

U.S. PATENT DOCUMENTS

| | | |
|---|---|---|
| 219,617 A | 9/1879 | Cady |
| 1,172,067 A | 2/1916 | Spiegel |
| (Continued) | | |

FOREIGN PATENT DOCUMENTS

| | | | |
|---|---|---|---|
| CN | 104237166 A | * | 12/2014 |
| CN | 209640527 U | * | 11/2019 |
| (Continued) | | | |

OTHER PUBLICATIONS

Oxford Languages, "fabricate," available at: https://www.google.com/search?q=fabricate+definition&rlz=1C1GCEA_en&oq=fabricate+def&aqs=chrome.0.0i512j69i57j0i512l2j0i10i512l3j0i512j0i22i30j0i15i22i30.8665j1j1&sourceid=chrome&ie=UTF-8, on Apr. 18, 2023.*
(Continued)

*Primary Examiner* — Jonathan G Riley
(74) *Attorney, Agent, or Firm* — McCarter & English, LLP

(57) ABSTRACT

The present disclosure provides an optical fiber and a method of fabricating an optical fiber. The method includes providing an optical fiber, the optical fiber defining a length having a proximal end and a distal end. The optical fiber includes a first core profile zone defining a first core diameter, and a second core profile zone defining a second core diameter different from the first core diameter. The optical fiber includes a first transition zone connecting the first core profile zone to the second core profile zone. The first core profile zone, the second core profile zone, and the first transition zone are formed as a single, continuous fiber.

19 Claims, 8 Drawing Sheets

Related U.S. Application Data

(60) Provisional application No. 62/661,466, filed on Apr. 23, 2018.

(51) Int. Cl.
  *B33Y 80/00* (2015.01)
  *C03B 37/012* (2006.01)
  *C03B 37/025* (2006.01)
  *C03B 37/027* (2006.01)

(52) U.S. Cl.
  CPC ........ *C03B 37/012* (2013.01); *C03B 37/0253* (2013.01); *C03B 37/027* (2013.01)

(58) Field of Classification Search
  CPC ............ C03B 37/01245; C03B 37/012; C03B 37/0253; C03B 37/027; H01S 3/06845; H01S 3/06745; G02B 6/25; G02B 6/2552; G02B 6/02042; B29D 11/00721; B33Y 80/00
  USPC .......................................................... 83/333
  See application file for complete search history.

(56) References Cited

U.S. PATENT DOCUMENTS

| | | | |
|---|---|---|---|
| 2,530,319 A | | 11/1950 | Young |
| 2,759,542 A | | 8/1956 | Weisshuhn |
| 3,779,628 A | | 12/1973 | Kapron et al. |
| 3,825,319 A | * | 7/1974 | Cook .................... G02B 6/262 385/98 |
| 3,875,837 A | | 4/1975 | Dussaud |
| 3,909,110 A | * | 9/1975 | Marcuse ............ G02B 6/02057 385/124 |
| 3,912,478 A | * | 10/1975 | Presby .............. C03B 37/02718 65/435 |
| 4,008,061 A | | 2/1977 | Ramsay |
| 4,049,413 A | * | 9/1977 | French .................. C03B 37/018 65/61 |
| 4,129,433 A | * | 12/1978 | Jaeger ................... C03B 37/027 65/435 |
| 4,205,901 A | * | 6/1980 | Ramsay ................. G02B 6/262 385/124 |
| 4,341,541 A | | 7/1982 | Dabby et al. |
| 4,622,055 A | * | 11/1986 | Mathyssek ............ B23K 9/013 65/433 |
| 5,058,978 A | * | 10/1991 | Kondoh ................... G02B 6/30 385/48 |
| 5,381,503 A | | 1/1995 | Kanamori |
| 5,729,643 A | * | 3/1998 | Hmelar ................ G02B 6/2551 385/98 |
| 6,125,225 A | | 9/2000 | Dianov et al. |
| 6,220,329 B1 | | 4/2001 | King et al. |
| 6,275,627 B1 | | 8/2001 | Wu |
| 6,301,934 B1 | | 10/2001 | Dobbins |
| 6,324,326 B1 | * | 11/2001 | Dejneka ............... G02B 6/1228 359/341.1 |
| 6,768,825 B2 | | 7/2004 | Maron et al. |
| 6,840,682 B2 | | 1/2005 | Terasawa et al. |
| 6,913,718 B2 | | 7/2005 | Ducker et al. |
| 8,089,689 B1 | | 1/2012 | Savage-Leuchs |
| 9,484,706 B1 | | 11/2016 | Koponen et al. |
| 9,972,961 B2 | | 5/2018 | Sipes, Jr. et al. |
| 2002/0057877 A1 | * | 5/2002 | Sasaoka ............... G02B 6/2552 385/95 |
| 2002/0094159 A1 | | 7/2002 | Goldberg et al. |
| 2003/0223693 A1 | | 12/2003 | Tallent et al. |
| 2005/0056952 A1 | | 3/2005 | Walker |
| 2007/0237453 A1 | | 10/2007 | Nielsen et al. |
| 2007/0280597 A1 | | 12/2007 | Nakai et al. |
| 2008/0267229 A1 | | 10/2008 | Kojima et al. |
| 2010/0278486 A1 | | 11/2010 | Holland et al. |
| 2012/0127563 A1 | | 5/2012 | Farmer et al. |
| 2012/0207435 A1 | | 8/2012 | Murphy et al. |
| 2014/0361452 A1 | | 12/2014 | Zheng |
| 2015/0055913 A1 | | 2/2015 | Imoto |
| 2015/0131943 A1 | * | 5/2015 | Iida ...................... G02B 6/2552 264/1.24 |
| 2016/0020573 A1 | | 1/2016 | Watanabe et al. |
| 2017/0191314 A1 | | 7/2017 | Faircloth et al. |
| 2017/0293072 A1 | * | 10/2017 | Kondo .................. G02B 6/421 |
| 2018/0188458 A1 | * | 7/2018 | Law ...................... G02B 6/4206 |
| 2019/0118302 A1 | * | 4/2019 | Hegenbart et al. |
| 2019/0175407 A1 | | 6/2019 | Bacher et al. |
| 2020/0041724 A1 | | 2/2020 | Kopp et al. |

FOREIGN PATENT DOCUMENTS

| | | | | |
|---|---|---|---|---|
| CN | 112346178 A | * | 2/2021 | ............ G02B 6/262 |
| JP | H09159862 A | * | 6/1997 | |
| JP | 2002372636 | * | 12/2002 | |
| JP | 2002372636 A | * | 12/2002 | |
| JP | 2004085830 A | * | 3/2004 | |
| JP | 2010163339 | | 7/2010 | |
| WO | WO-2014086393 A1 | * | 6/2014 | ............ G02B 6/421 |

OTHER PUBLICATIONS https://www.dictionary.com/browse/optical-fiber, last visited May 30, 2024.*

Extended European Search Report from related European Patent Application No. 19177600.4 issue Nov. 11, 2019.

U.S. Appl. No. 62/661,466, filed Apr. 23, 2018.

U.S. Appl. No. 16/390,582, filed Apr. 22, 2019, US 2019-0324208 A1.

1 Office Action from related European Patent Application No. 22151661.0 issue Mar. 21, 2023.

* cited by examiner

US 12,493,147 B2

CONTINUOUSLY FORMED OPTICAL FIBER WITH DIFFERENT CORE PROFILE ZONES

CROSS-REFERENCE TO RELATED APPLICATIONS

This application is a continuation-in-part application of, and claims priority to, U.S. Non-Provisional patent application Ser. No. 16/390,582, which was filed on Apr. 22, 2019, which claims the benefit of U.S. Provisional Patent Application entitled "CYCLIC CORE VARIANCE SYSTEM," which was filed on Apr. 23, 2018, and assigned Ser. No. 62/661,466, the entire contents of the foregoing patent applications hereby expressly incorporated by reference in their entirety.

FIELD OF THE DISCLOSURE

The present disclosure relates to systems and methods of fabrication, and more particularly, to fabrication of an optical fiber with sequential varying core profile zones. The present disclosure also relates to systems and methods of fabrication of optical fibers with a sequential varying core structures, such as but not limited to, index profile, locations, number of cores, core shapes, or the like. The present disclosure also relates to optical devices (e.g., discrete passive optical devices) and related systems and methods of fabrication and, more particularly, to discrete passive optical devices fabricated from a cyclic core variance process/method.

BACKGROUND OF THE DISCLOSURE

In general, conventional optical fiber is produced using a longitudinally constant core profile embedded within a cladding with a lower index of refraction. This allows long, continuous runs of optical fiber to be produced at acceptable cost.

Some conventional direct mating of certain fiber types (e.g., between OM1 fiber, which has a 62.5 μm core diameter, and OM3 fiber, which has a slightly smaller 50 μm core diameter) involves a connection with a core and/or index mismatch, thereby leading to large insertion loss (e.g., about 3.5 dB) and high signal reflection when going from the larger diameter fiber (e.g., OM1 fiber) to the smaller diameter fiber (e.g., OM3 fiber).

Moreover, current splitter technology (e.g., for a 1×4 optical splitter) has symmetrical loss, that is, the loss in the splitting direction can be equal to that in the merging direction.

For example, a basic element of both a fused biconical taper (FBT) and a planar lightwave circuit (PLC) is actually a 2×2 splitter element, with one of the input ends cut away. This lead still collects its share of energy in the merging direction, but this energy is simply lost.

Some conventional optical fibers may be fabricated and sold in kilometers or tens of kilometers in length based on the standard size of the preform used for fabrication. This can be problematic if the end user only needs tens or hundreds of meters worth of optical fiber. In some instances, the end user may need optical fibers having special core sizes, index profiles, off-center core locations, differing numbers of cores, and/or specialized patterns for the multiple cores. Due to the standard length of conventional optical fibers, such end users may be forced to purchase an entire run of fiber, resulting in increased costs and potential waste of the optical fiber. Product of specialty optical fibers for research and development is generally cost prohibitive due to limitations on minimum length for production, and the production time required to form the specialty fibers.

Thus, an interest exists for improved optical fibers, optical devices, and related systems and methods of fabrication.

These and other inefficiencies and opportunities for improvement are addressed and/or overcome by the systems, methods and assemblies of the present disclosure.

SUMMARY OF THE DISCLOSURE

The present disclosure provides advantageous optical devices (e.g., discrete passive optical devices), and improved systems and methods for fabricating such optical devices. More particularly, the present disclosure provides improved systems and methods for fabricating discrete passive optical devices by utilizing an advantageous cyclic core variance fabrication process/method.

In general, the advantageous cyclic core variance process/method of the present disclosure employs a continuous process, but instead of having one constant core profile of the optical fiber, the core profile of the optical fiber varies cyclically, going back and forth between two or more core profile zones a plurality of times along the length of the optical fiber, with a transition zone (e.g., a gradual and properly-shaped transition zone) in between each successive varied core profile zone of the optical fiber.

The core profile zones and transition zone TZ can be custom formed (e.g., user-defined) to produce/fabricate a variety of optical effects of the fabricated optical devices as desired, thereby allowing a large variety of optical devices to be fabricated utilizing the exemplary cyclic core variance process/method of the present disclosure.

The present disclosure provides for a method for fabricating an optical device including providing an optical fiber, the optical fiber having two or more core profile zones that vary cyclically a plurality of times along the length of the optical fiber, with transition zones in between each successive varied core profile zone of the optical fiber.

The present disclosure also provides for a method for fabricating an optical device further including cleaving the optical fiber at a first core profile zone; and cleaving the optical fiber at a second core profile zone, with a first transition zone extending from the first core profile zone to the second core profile zone; wherein the first core profile zone is different than the second core profile zone.

The present disclosure also provides for a method for fabricating an optical device wherein the first core profile zone has a first core diameter, and the second core profile zone has a second core diameter, the first core diameter different than the second core diameter. The present disclosure also provides for a method for fabricating an optical device wherein the first core diameter is about 62.5 μm, and the second core diameter is about 50 μm.

The present disclosure also provides for a method for fabricating an optical device wherein the optical fiber is a glass optical fiber. The present disclosure also provides for a method for fabricating an optical device wherein the optical fiber is a plastic optical fiber.

The present disclosure also provides for a method for fabricating an optical device wherein the first transition zone includes a transition zone core diameter that tapers from the first core diameter of the first core profile zone to the second core diameter of the second core profile zone.

The present disclosure also provides for a method for fabricating an optical device further including cleaving the optical fiber at a third core profile zone and cleaving the optical fiber at a fourth core profile zone, with a second transition zone extending from the third core profile zone to the fourth core profile zone.

The present disclosure also provides for a method for fabricating an optical device wherein the third core profile zone is substantially the same as the first core profile zone, and the fourth core profile zone is substantially the same as the second core profile zone.

The present disclosure also provides for a method for fabricating an optical device wherein the first core profile zone extends from a first cleaved end to a first transition point positioned proximal to a first end of the first transition zone; wherein the second core profile zone extends from a second cleaved end to a second transition point positioned proximal to a second end of the first transition zone; and wherein the first transition zone extends from the first transition point to the second transition point.

The present disclosure also provides for a method for fabricating an optical device wherein the optical fiber is cleaved at the mid-point of the first core profile zone, and the optical fiber is cleaved at the mid-point of the second core profile zone.

The present disclosure also provides for a method for fabricating an optical device wherein the first and second core diameters are surrounded by cladding.

The present disclosure also provides for a method for fabricating an optical device wherein the first core profile zone has a first core diameter, and the second core profile zone has a second core diameter, the first core diameter different than the second core diameter; wherein the first core diameter extends from the first cleaved end to the first transition point, and the second core diameter extends from the second cleaved end to the second transition point.

The present disclosure also provides for a method for fabricating an optical device wherein the transition zone core diameter is connected to and extends from the first core diameter to the second core diameter, with the transition zone core diameter tapering from the first core diameter to the second core diameter. The present disclosure also provides for a method for fabricating an optical device wherein the first core diameter is about 62.5 µm, and the second core diameter is about 50 µm.

The present disclosure also provides for a method for fabricating an optical device wherein a first cleaved end of the first core profile zone includes a first outer diameter, and a second cleaved end of the second core profile zone includes a second outer diameter, the first outer diameter substantially the same size as the second outer diameter.

The present disclosure also provides for a method for fabricating an optical device wherein the transition zone core diameter tapers at an angle of less than about one degree from the first core diameter to the second core diameter.

The present disclosure also provides for a method for fabricating an optical device further including cleaving the optical fiber at a third core profile zone having a third core diameter and cleaving the optical fiber at a fourth core profile zone having a fourth core diameter, with a second transition zone extending from the third core profile zone to the fourth core profile zone; wherein the third core diameter is substantially the same size as the first core diameter, and the fourth core diameter is substantially the same size as the second core diameter.

The present disclosure also provides for a method for fabricating an optical device wherein the first core profile zone includes one core, and the second core profile zone includes two or more cores, and the first transition zone includes the two or more cores; wherein the two or more cores in first transition zone are connected to and extend from the two or more cores in the second core profile zone, and the two or more cores in the first transition zone are connected to and extend from the one core in the first core profile zone.

The present disclosure also provides for a method for fabricating an optical device wherein the first core profile zone extends from a first cleaved end to a first transition point positioned proximal to a first end of the first transition zone; wherein the second core profile zone extends from a second cleaved end to a second transition point positioned proximal to a second end of the first transition zone; wherein the first transition zone extends from the first transition point to the second transition point; and wherein the two or more cores in the first transition zone angle downwardly from the second transition point to the first transition point and connect with the one core in the first core profile zone.

The present disclosure also provides for a method for fabricating an optical device wherein proximal to the first transition point the one core in the first core profile zone splits off into the two or more cores of the first transition zone, the two or more cores angling upwards from the first transition point to the second transition point.

The present disclosure also provides for a method for fabricating an optical device wherein the one core in the first core profile zone extends from the first cleaved end to the first transition point, and the two or more cores in the second core profile zone extend from the second cleaved end to the second transition point.

The present disclosure also provides for a method for fabricating an optical device wherein the first core profile zone is fabricated by irradiating the optical fiber at a first level, and the second core profile zone is fabricated by irradiating the optical fiber at a second level, the first level different than the second level.

The present disclosure also provides for a method for fabricating an optical device including providing an optical fiber, the optical fiber having two or more core profile zones that vary cyclically a plurality of times along the length of the optical fiber, with transition zones in between each successive varied core profile zone of the optical fiber; cleaving the optical fiber at a first core profile zone having a first core diameter; and cleaving the optical fiber at a second core profile zone having a first core diameter, with a first transition zone extending from the first core profile zone to the second core profile zone; wherein the first core diameter is different than the second core diameter; wherein the first transition zone includes a transition zone core diameter that tapers from the first core diameter of the first core profile zone to the second core diameter of the second core profile zone; wherein the first core profile zone extends from a first cleaved end to a first transition point positioned proximal to a first end of the first transition zone; wherein the second core profile zone extends from a second cleaved end to a second transition point positioned proximal to a second end of the first transition zone; wherein the first transition zone extends from the first transition point to the second transition point; wherein the optical fiber is cleaved at the mid-point of the first core profile zone, and the optical fiber is cleaved at the mid-point of the second core profile zone; wherein the first and second core diameters are surrounded by cladding; wherein the transition zone core diameter is connected to and extends from the first core diameter to the second core diameter, with the transition zone core diameter tapering from the first core diameter to the second core diameter; and wherein a first cleaved end of the first core profile zone includes a first outer diameter, and a second cleaved end of the second core profile zone includes a second outer diameter, the first outer diameter substantially the same size as the second outer diameter.

The present disclosure also provides for a method for fabricating an optical device including providing an optical fiber, the optical fiber having two or more core profile zones that vary cyclically a plurality of times along the length of the optical fiber, with transition zones in between each successive varied core profile zone of the optical fiber; cleaving the optical fiber at a first core profile zone; and cleaving the optical fiber at a second core profile zone, with a first transition zone extending from the first core profile zone to the second core profile zone; wherein the first core profile zone is different than the second core profile zone; wherein the first core profile zone includes one core, and the second core profile zone includes two or more cores, and the first transition zone includes the two or more cores; wherein the two or more cores in first transition zone are connected to and extend from the two or more cores in the second core profile zone, and the two or more cores in first transition zone are connected to and extend from the one core in the first core profile zone; wherein the first core profile zone extends from a first cleaved end to a first transition point positioned proximal to a first end of the first transition zone; wherein the second core profile zone extends from a second cleaved end to a second transition point positioned proximal to a second end of the first transition zone; and wherein the first transition zone extends from the first transition point to the second transition point; wherein the two or more cores in the first transition zone angle downwardly from the second transition point to the first transition point and connect with the one core in the first core profile zone; wherein proximal to the first transition point the one core in the first core profile zone splits off into the two or more cores of the first transition zone, the two or more cores angling upwards from the first transition point to the second transition point; wherein the optical fiber is cleaved at the midpoint of the first core profile zone, and the optical fiber is cleaved at the mid-point of the second core profile zone; wherein the first and second core diameters are surrounded by cladding; and wherein the first cleaved end of the first core profile zone includes a first outer diameter, and the second cleaved end of the second core profile zone includes a second outer diameter, the first outer diameter substantially the same size as the second outer diameter.

The present disclosure also provides advantageous optical fibers, and improved systems and methods for fabricating such optical fibers. More particularly, the present disclosure provides improved systems and methods for fabricating optical fibers by selectively adjusting and maintaining the drawing speed during the fabrication process, resulting in a continuous optical fiber having lengths of different core index profile diameters. The improved systems and methods allow for fabrication of different fiber sizes in a single run to minimize costs associated with production of the optical fiber and to minimize waste by the end user.

In accordance with embodiments of the present disclosure, an exemplary method of fabricating an optical fiber is provided. The method includes drawing and/or providing an optical fiber. The optical fiber defines a length having a proximal end and a distal end. The optical fiber includes a first core profile zone defining a first core diameter, a second core profile zone defining a second core diameter different from the first core diameter, and a first transition zone connecting the first core profile zone to the second core profile zone. The first core profile zone, the second core profile zone, and the first transition zone are formed as a single, continuous fiber (e.g., free of splicing).

The optical fiber includes a cladding disposed around the first core profile zone, the second core profile zone, and the first transition zone. The cladding defines a uniform or substantially uniform outer diameter between the proximal and distal ends of the optical fiber. In some embodiments, the first core diameter can be about 62.5 µm, and the second core diameter can be about 50 µm. The optical fiber can be a glass optical fiber or a plastic optical fiber.

The first transition zone includes a first transition zone core diameter that tapers from the first core diameter of the first core profile zone to the second core diameter of the second core profile zone. In some embodiments, the optical fiber can include a third core profile zone defining a third core diameter different from the first and second core diameters. In such embodiments, the optical fiber includes a second transition zone connecting the second core profile zone to the third core profile zone. The second transition zone includes a second transition zone core diameter that tapers from the second core diameter of the second core profile zone to the third core diameter of the third core profile zone.

In some embodiments, a longitudinal length of the first core profile zone is dimensioned different than a longitudinal length of the second core profile zone. In some embodiments, a longitudinal length of the third core profile zone is dimensioned different than a longitudinal length of the first and second core profile zones. In some embodiments, a longitudinal length of the first transition zone is dimensioned different than a longitudinal length of the second transition zone. In some embodiments, the longitudinal length of the first and second transition zones can be dimensioned equal or substantially equal. The single, continuous fiber defines a core free of splicing.

In some embodiments, the optical fiber can include a third core profile zone, the first core profile zone including a single core and the third core profile zone including two or more cores. In some embodiments, the first core profile zone can include a core concentrically positioned relative to a central longitudinal axis of the optical fiber, and the second core profile zone can include a core non-concentrically positioned relative to the central longitudinal axis of the optical fiber. In some embodiments, the first core profile zone can include a core with a first polarization-maintaining level, and the second core profile zone can include a core with a second polarization-maintaining level different from the first polarization-maintaining level.

In accordance with embodiments of the present disclosure, an exemplary optical fiber is provided. The optical fiber includes an optical fiber core extending a length between a proximal end and a distal end. The optical fiber core includes a first core profile zone defining a first core diameter, a second core profile zone defining a second core diameter different from the first core diameter, and a first transition zone connecting the first core profile zone to the second core profile zone. The first core profile zone, the second core profile zone, and the first transition zone are formed as a single, continuous fiber.

The optical fiber includes a cladding disposed around the first core profile zone, the second core profile zone, and the first transition zone. The cladding defines a uniform or substantially uniform outer diameter between the proximal and distal ends of the optical fiber. The first transition zone includes a first transition zone core diameter that tapers from the first core diameter of the first core profile zone to the second core diameter of the second core profile zone. In some embodiments, a longitudinal length of the first core profile zone is dimensioned different than a longitudinal length of the second core profile zone. The single, continuous fiber defines a core free of splicing.

In accordance with embodiments of the present disclosure, an exemplary optical fiber is provided. The optical fiber includes an optical fiber core extending a length between a proximal end and a distal end. The optical fiber core includes a first core profile zone defining a first core diameter, a second core profile zone defining a second core diameter different from the first core diameter, and a first transition zone connecting the first core profile zone to the second core profile zone. The optical fiber core includes a third core profile zone defining a third core diameter different from the first and second core diameters, and a second transition zone connecting the second core profile zone to the third core profile zone. The optical fiber includes a cladding disposed around the first core profile zone, the second core profile zone, the third core profile zone, the first transition zone, and the second transition zone. The first core profile zone, the second core profile zone, the third core profile zone, the first transition zone, and the second transition zone are formed as a single, continuous fiber free from splicing.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein.

DETAILED DESCRIPTION OF DISCLOSURE

Figure 1:
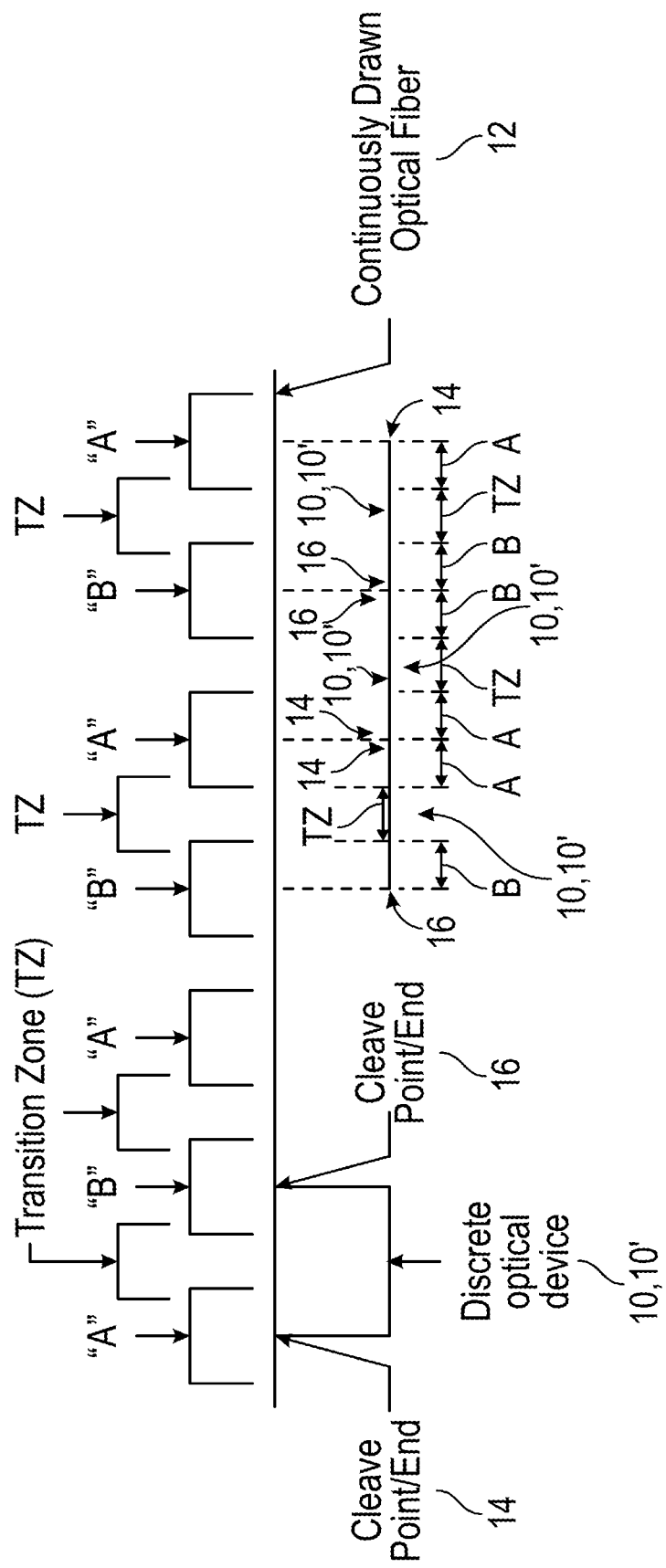
FIG. 1 is a schematic of an exemplary cyclic core variance process/method for fabricating optical devices, according to the present disclosure.

The exemplary embodiments disclosed herein are illustrative of advantageous optical devices (e.g., discrete passive optical devices), and systems of the present disclosure and fabrication methods/techniques thereof. It should be understood, however, that the disclosed embodiments are merely exemplary of the present disclosure, which may be embodied in various forms. Therefore, details disclosed herein with reference to exemplary optical devices/fabrication methods and associated processes/techniques of assembly and use are not to be interpreted as limiting, but merely as the basis for teaching one skilled in the art how to make and use the advantageous optical devices/systems and/or alternative optical devices/systems of the present disclosure.

The present disclosure provides improved optical devices (e.g., discrete passive optical devices), and improved systems and methods for fabricating such optical devices. More particularly, the present disclosure provides advantageous systems and methods for fabricating discrete passive optical devices by utilizing an advantageous cyclic core variance fabrication process/method.

Referring now to the drawings, like parts are marked throughout the specification and drawings with the same reference numerals, respectively. Drawing figures are not necessarily to scale and in certain views, parts may have been exaggerated for purposes of clarity.

FIG. 1 is a schematic of an exemplary cyclic core variance process/method for fabricating optical devices 10 (or 10', etc.) according to the present disclosure.

In general, the cyclic core variance process/method as depicted in FIG. 1 can utilize some processes of optical fiber production (both glass and plastic optical fiber) to fabricate optical devices 10, 10' (e.g., discrete passive optical devices 10, 10').

It is noted that conventional optical fiber is produced using a constant core profile embedded within a cladding with a higher index of refraction. This allows long, continuous runs of optical fiber to be produced at acceptable cost.

The exemplary cyclic core variance process/method of the present disclosure employs a continuous process. However, instead of having one constant core profile of the optical fiber, the core profile of the optical fiber varies cyclically, going back and forth between two or more core profile zones a plurality of times along the length of the optical fiber, with a transition zone TZ (e.g., a gradual and properly-shaped transition zone) in between each successive varied core profile zone of the optical fiber. FIG. 1 illustrates an exemplary process/method of how this is accomplished.

It is noted that the cyclic core variance processes/methods of the present disclosure are not limited to just two core profiles (e.g., zone A and zone B), and that repeating cycles of more than two core profiles (e.g., zones A, B and C; etc.) may also be utilized in some applications/methods.

In certain embodiments and as discussed further below, each transition zone TZ includes a transition zone core profile having a transition zone core diameter that tapers (e.g., gradually tapers) between each respective successive varied core profile zone of the optical fiber 12.

As shown in FIG. 1, an optical fiber 12, being continuously produced (e.g., drawn for glass optical fiber 12 production; or extruded for plastic optical fiber 12 production), alternates at least between a plurality of core profile zones A and core profile zones B a plurality of times along the length of the optical fiber 12.

A transition zone TZ (e.g., a gradual and properly-shaped transition zone TZ) is positioned in between each successive varied core profile zones A and B of the optical fiber 12.

Figure 3:
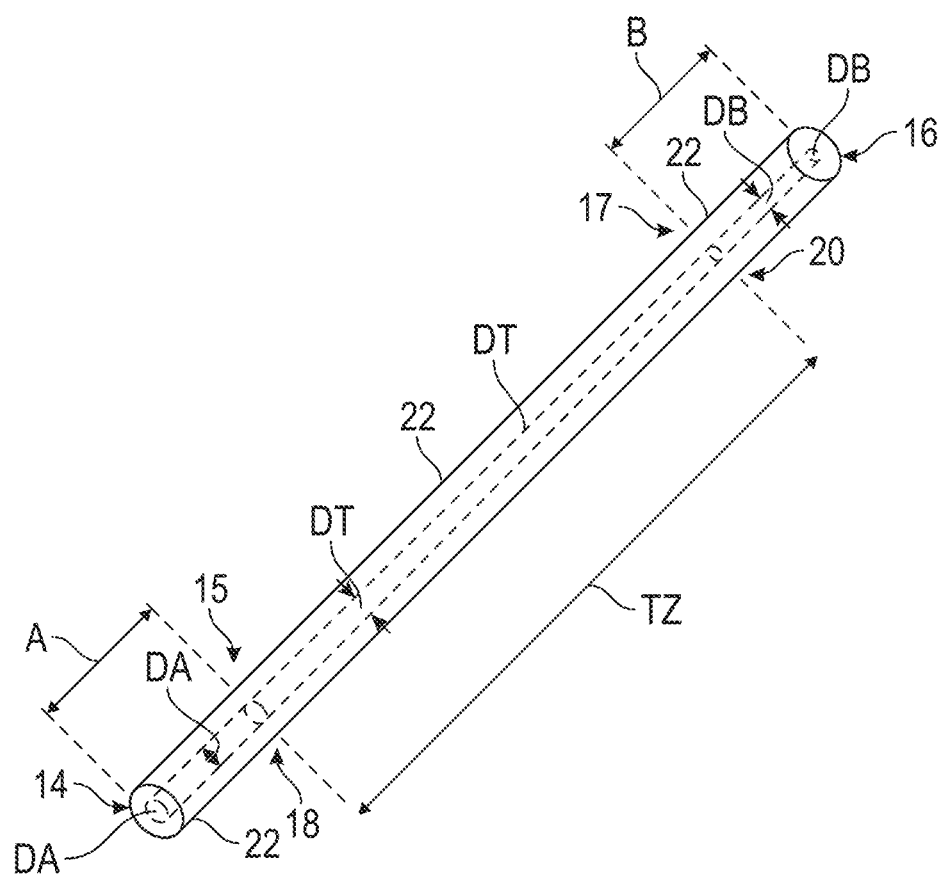
FIG. 3 is a side perspective view of the exemplary optical device of FIG. 2A and FIG. 2B.
Figure 4:
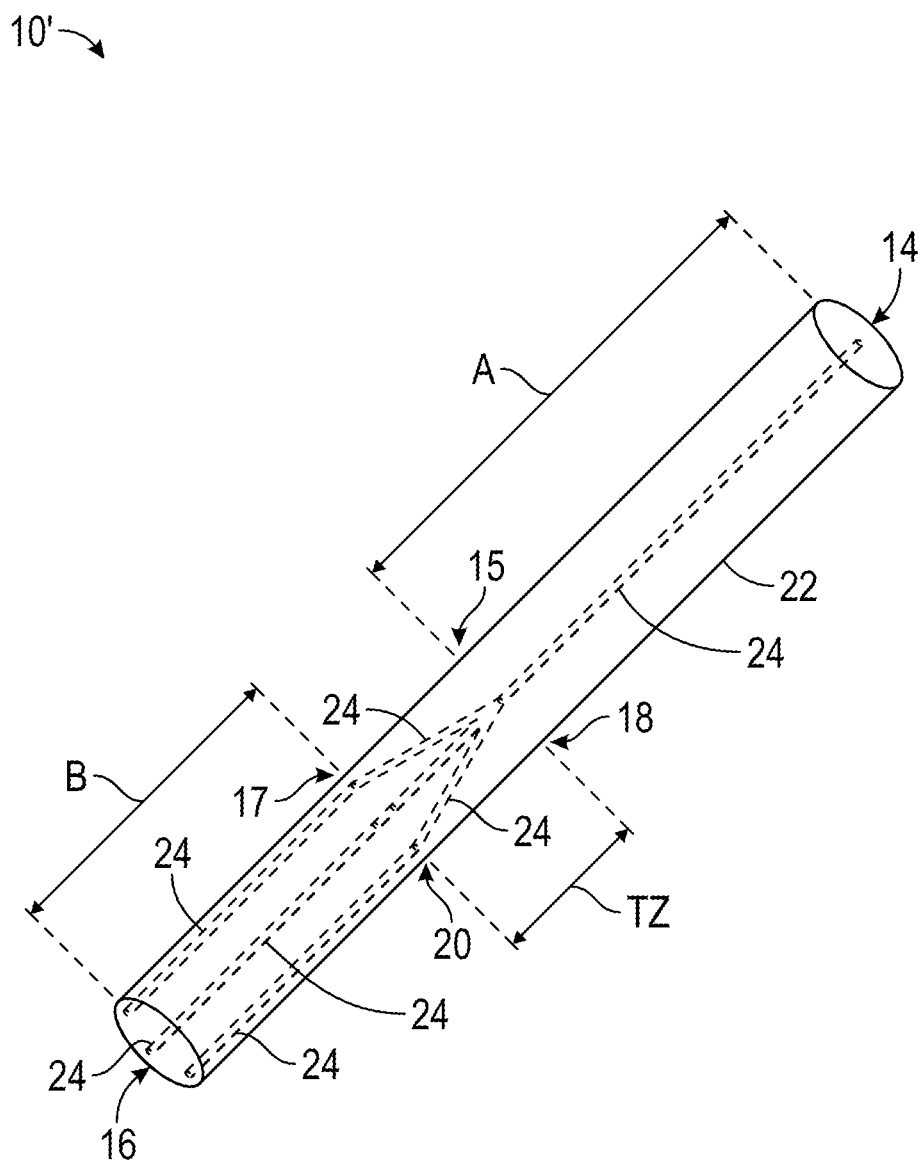
FIG. 4 is a side perspective view of the exemplary optical device of FIG. 2C and FIG. 2D.

As shown in FIGS. 1, 3 and 4, by cleaving the fiber 12 repeatedly in each core profile zone A and B (e.g., in the center or mid-point of each core profile zone A and B), a plurality of discrete lengths/devices 10, 10' from fiber 12 can be fabricated, with core profile zone A extending from one cleaved end 14 of length/device 10, 10', and with core profile zone B extending from the other cleaved end 16 of length/device 10, 10', and with a transition zone TZ positioned between core profile zones A and B for each discrete length/device 10, 10' fabricated. It is noted that the cleaving process can utilize a method of cleaving optical fiber as is used in mechanical splicing or fusion splicing of optical fiber.

As such, for each discrete length/device 10, 10' fabricated from fiber 12, each length/device 10, 10' includes a core profile zone A extending from one cleaved end 14 to a transition point 15 positioned proximal to a first end 18 of the transition zone TZ, a core profile zone B extending from the other cleaved end 16 to a transition point 17 positioned proximal to a second end 20 of the transition zone TZ, and with the transition zone TZ extending from first end 18 to second end 20 (e.g., TZ extending from transition point 15 of core profile zone A to transition point 17 of core profile zone B).

As shown in FIG. 1, for every cycle of core profile zone A to core profile zone B and back to core profile zone A of fiber 12, two substantially identical discrete lengths/devices 10, 10' can be produced, with opposing orientation of the two substantially identical discrete lengths/devices 10, 10'.

The core profile zones A, B, etc., and transition zone TZ can be custom formed (e.g., user-defined) to produce/fabricate a variety of optical effects of device 10, 10' as desired, thereby allowing a large variety of optical devices 10, 10' to be fabricated utilizing the exemplary cyclic core variance process/method of the present disclosure.

It is noted that the cyclic core variance process/method of the present disclosure can be used to cheaply mass produce substantially any passive optical device intended to connect with optical fiber. As long as the optics are physically possible, the cyclic core variance process/method of the present disclosure generally can be used to make the devices in large numbers at low cost.

Figures 2A, 2B:
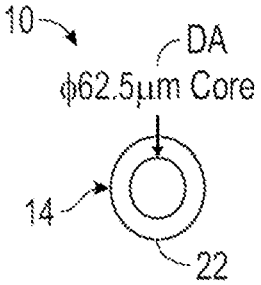
FIG. 2A and FIG. 2B show end views of varying core profile zones of an exemplary optical device fabricated from a cyclic core variance process/method of the present disclosure.

FIG. 2A and FIG. 2B show end views 14, 16 of varying core profile zones A, B of an exemplary optical device 10 fabricated from a cyclic core variance process/method of the present disclosure.

Figures 2C, 2D:
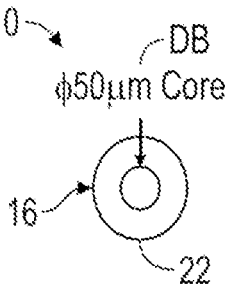
FIG. 2C and FIG. 2D show end views of varying core profile zones of another exemplary optical device fabricated from a cyclic core variance process/method of the present disclosure.

FIG. 2C and FIG. 2D show end views 14, 16 of varying core profile zones A, B of another exemplary optical device 10' fabricated from a cyclic core variance process/method of the present disclosure.

As shown in FIG. 2A, FIG. 2B and FIG. 3, exemplary optical device 10 takes the form of an adapter link 10.

Exemplary optical device 10 allows a low-loss connection between fiber having a core diameter DA (e.g., OM1 fiber having a 62.5 μm core diameter DA) in core profile zone A, and fiber having a core diameter DB (e.g., OM3 fiber having a slightly smaller 50 μm core diameter DB) in core profile zone B.

In general and as depicted in FIG. 3, core diameter DA (e.g., about 62.5 μm core diameter DA) of core profile A is surrounded by cladding 22, and core diameter DA extends from cleaved end 14 to the transition point 15 positioned proximal to first end 18 of the transition zone TZ.

Core diameter DB (e.g., about 50 μm core diameter DB) of core profile B is surrounded by cladding 22, and core diameter DB extends from other cleaved end 16 to the transition point 17 positioned proximal to second end 20 of the transition zone TZ.

The transition zone TZ of device 10 extends from first end 18 to second end 20 (e.g., TZ extends from transition point 15 of core profile zone A to transition point 17 of core profile zone B).

Exemplary transition zone TZ of device 10 includes a transition zone core profile having a core diameter DT that is surrounded by cladding 22, with the core diameter DT tapering (e.g., gradually tapering) from first end 18 to second end 20 of the transition zone TZ. As such, the diameter of exemplary core diameter DT tapers (e.g., gradually tapers) from a diameter of about 62.5 μm proximal to first end 18 and proximal to transition point 15, and tapers to a diameter of about 50 μm proximal to second end 20 and proximal to transition point 17. As such, core diameter DT is connected to and extends from core diameter DA to core diameter DB, with the core diameter DT tapering from core diameter DA to core diameter DB.

With reference again to FIG. 1, it is noted that each core profile zone A of optical fiber 12 can include fiber having a larger core diameter DA (e.g., OM1 fiber having a 62.5 μm core diameter DA) in each core profile zone A of fiber 12, and each core profile zone B of optical fiber 12 can include fiber having a smaller core diameter DB (e.g., OM3 fiber having a slightly smaller 50 μm core diameter DB in each core profile zone B of fiber 12), although the present disclosure is not limited thereto.

In other embodiments, each core profile zone A of optical fiber 12 can include fiber having a smaller core diameter DA in each core profile zone A of fiber 12, and each core profile zone B of optical fiber 12 can include fiber having a larger core diameter DB. It is noted that fibers other than OM1 and/or OM3 having different core diameters can be utilized in fiber 12 and in zones A and/or B to produce/fabricate devices 10.

Conventional practice provides that direct mating of a larger diameter fiber (e.g., OM1 fiber having a 62.5 μm core diameter) with a smaller diameter fiber (e.g., OM3 fiber having a 50 μm core diameter) involves a connection with a core mismatch, leading to large insertion loss (e.g., about 3.5 dB) and high signal reflection when going from the larger diameter fiber (e.g., OM1 fiber) to the smaller diameter fiber (e.g., OM3 fiber).

Each adapter link 10 produced using the cyclic core variance process/method of the present disclosure transitions smoothly (e.g., with the core diameter DT gradually tapering from zone A to zone B) between the core profile zones A and B, with minimal insertion loss and low signal reflection. It is noted that each device or adapter link 10 fabricated from the cyclic core variance process/method can utilize a glass optical fiber 12 (e.g., drawn glass optical fiber 12) or a plastic optical fiber 12 (e.g., extruded plastic optical fiber 12), as discussed further below.

As shown in FIG. 3, the larger core diameter fiber (e.g., OM1 fiber having a 62.5 μm core diameter DA) is in front (left side of FIG. 3), and the smaller core diameter fiber (e.g., OM3 fiber having a 50 μm core diameter DB) is in the back.

In certain embodiments, it is noted that the outer diameter of end 14 and of zone A (e.g., 125 μm outer diameter of core DA plus surrounding cladding 22) can be substantially equal to the outer diameter of end 16 and of zone B (e.g., 125 μm outer diameter of core DB plus surrounding cladding 22), and can be substantially equal to the outer diameter of the transition zone TZ (e.g., 125 μm outer diameter of tapering core DT plus surrounding cladding 22), although the present disclosure is not limited thereto.

In certain embodiments, the transition zone TZ between core profile zones A and B includes an almost imperceptible taper of core diameter DT tapering from zone A to zone B, which in some applications can be drawn out over a meter or more. Over such lengths, the taper angle of core diameter DT tapering from zone A to zone B is almost zero (e.g., about 0.00036 degrees over a one-meter length of the TZ from zone A to zone B; tapers at an angle of less than about one degree from the first core diameter to the second core diameter), which can minimize insertion loss on higher-order modes, as well as limit modal dispersion.

With reference now to FIG. 4, another exemplary optical device 10' fabricated from a cyclic core variance process/method of the present disclosure is depicted. In general, optical device 10' is fabricated from glass optical fiber 12 (e.g., drawn glass optical fiber 12) or the like.

FIG. 2C and FIG. 2D show end views 14, 16 of varying core profile zones A, B of optical device 10'. As shown in FIG. 2C, FIG. 2D and FIG. 4, exemplary optical device 10' takes the form of an optical splitter 10' (e.g., a 1×4 optical splitter, as can be utilized in passive optical LAN (POL) applications). As depicted in FIG. 4, device 10' fabricated from cleaved fiber 12 includes core profile zone A, core profile zone B, and transition zone TZ positioned between zones A and B.

In general, zone A of device 10' transitions, via transition zone TZ, from a fiber having a first profile in zone A to a second profile in zone B.

In an exemplary embodiment, the first profile in zone A includes a single core 24 (e.g., a single nine-μm singlemode core 24) surrounded by cladding 22. Exemplary second profile in zone B includes two or more cores 24 (e.g., four nine-μm cores 24) surrounded by cladding 22. The two or more cores 24 (e.g., four cores 24) in transition zone TZ are connected to and extend from the cores 24 in zone B, and the cores 24 in transition zone TZ angle downwardly from zone B to zone A (FIG. 4) and connect with the core 24 in zone A. At transition point 15, the single core 24 of zone A begins to split off into the four cores 24 of zone B and the TZ, the four cores 24 thereby beginning to angle upwards from transition point 15 and first end 18 of TZ to the second end 20 and transition point 17 of zone B.

As such, optical device 10' advantageously divides the energy from a single input 24 four ways, and merges the energy from the four legs/cores 24 into the one for light traveling in the other direction.

In general and as depicted in FIG. 4, core 24 of zone A extends from cleaved end 14 to the transition point 15 positioned proximal to first end 18 of the transition zone TZ.

The four cores 24 of zone B extend from other cleaved end 16 to the transition point 17 positioned proximal to second end 20 of the transition zone TZ.

The transition zone TZ of device 10' extends from first end 18 to second end 20 (e.g., TZ extends from transition point 15 of core profile zone A to transition point 17 of core profile zone B).

As noted, the four cores 24 in transition zone TZ angle downwardly from zone B to zone A (e.g., from second end 20 to first end 18).

In other embodiments, it is noted that zone A could include other numbers of cores 24 (e.g., two, three, four, a plurality, etc.), and that zone B could include other numbers of cores 24 (e.g., one, two, three, a plurality, etc.), and that the TZ could include other numbers of cores 24 (e.g., one, two, three, a plurality, etc.). In general, device 10' is configured and dimensioned to transition, via transition zone TZ, from a fiber having a first profile (e.g., having a certain number of cores 24) in zone A to a second profile (e.g., having a certain number of cores 24) in zone B.

Current practice provides that conventional splitter technology has symmetrical loss, that is, the loss in the splitting direction can be equal to that in the merging direction. For example, a basic element of both a fused biconical taper (FBT) and a planar lightwave circuit (PLC) is actually a 2×2 splitter element, with one of the input ends cut away. This lead still collects its share of energy in the merging direction, but this energy is simply lost.

However, the optical device 10' fabricated from a cyclic core variance process/method of the present disclosure is truly convergent, meaning that very little energy would be lost in the merge (of cores 24), reducing the requisite transmission power of the connected optical network terminals (ONTs). So, in addition to being less expensive to produce than FBT- and PLC-based splitters, the exemplary splitter/device 10' is more energy efficient and can advantageously enable additional cost savings within the connected hardware.

In certain embodiments, it is noted that the outer diameter of end 14 and of zone A (e.g., 125 μm outer diameter of core 24 plus surrounding cladding 22) of device 10' can be substantially equal to the outer diameter of end 16 and of zone B (e.g., 125 μm outer diameter of cores 24 plus surrounding cladding 22), and can be substantially equal to the outer diameter of the transition zone TZ (e.g., 125 μm outer diameter of angled cores 24 plus surrounding cladding 22), although the present disclosure is not limited thereto.

In general, the applications of devices 10, 10' may be limited by the core profile zones (e.g., zones A and B) which can be worked into the devices 10, 10'.

For glass fiber production for fabricating glass fiber 12, this could be accomplished by carefully crafting the preform to draw out to the desired shape of fiber 12, and once accomplished, the desired devices 10, 10' could be produced by the thousands or more, at a cost of a few cents each.

For glass fiber production for fabricating glass fiber 12, instead of having a uniform cross section, the preform could be made with a cross section which varies cyclically, and which once drawn to its final diameter could take the interior core profile desired, both in the steady state zones (zones "A" and "B"), and in the transition zones. It is noted that the natural behavior of glass, and particularly the boundary area between core and cladding material, can be favorable for the systems/methods of the present disclosure.

For plastic optical fiber production for fabricating plastic optical fiber 12, the process is a bit different, whereby the cladding 22 is created by bombarding the outside of the fiber 12 with radiation as it is extruded. In this case, one could vary the radiation profile cyclically during the extrusion process, thereby allowing continuous production of fiber 12 at low cost. In exemplary embodiments and for plastic optical fiber production for fabricating plastic optical fiber 12, the plastic is extruded at its final diameter, and then the outside of it is irradiated to change its optical properties—in effect, "burning in" a cladding layer on the outside. This process could be comparatively user-friendly to fabricate an exemplary adapter link 10 shown in FIG. 3.

In certain embodiments, the output power of the irradiation can determine the depth of the cladding 22, and thus the final size of the core region (e.g., DA, DB, DT). More power means deeper cladding 22 (e.g., for zone B), which in turn means a smaller core diameter (e.g., for diameter DB).

To fabricate an exemplary adapter link 10 of FIG. 3, a lower power irradiation could be employed to form zone "A" (e.g., 62.5 µm core diameter DA), and a higher power irradiation to form zone "B" (e.g., 50 µm core diameter DB). In the transition zone, the output power could be slowly ramped from one level to the other (e.g., from end 18 to end 20 of TZ). The fiber could be extruded continuously, and irradiated as it is extruded.

Further, it is noted that exemplary cyclic core variance methods of the present disclosure can produce fibers 12 with a constant cladding 22 diameter, which in turn can advantageously ensure compatibility with current, low-cost fiber alignment and termination techniques.

In general, the cyclic core variance systems/methods of the present disclosure can enable a wide range of passive optical devices 10, 10' to be mass-produced at extremely low cost. It is noted that some competing conventional assemblies are attempted to be fabricated utilizing more expensive processes, exhibit lower performance, and in many cases, cannot be produced (e.g., economically) at all. Some conventional device examples include optical filters, multiplexers/demultiplexers, self-focusing lenses, and many others.

The cyclic core variance system/method of the present disclosure is inherently a low-cost, high-volume production process, with an added advantage of superior device 10, 10' performance in many applications.

It is noted that the transition zone TZ between the steady-state profiles (core profile zones A, B) can vary in length and sometimes can be just a point (sudden step) change (e.g., as it may be for a Bragg Grating device fabricated with the cyclic core variance system/method of the present disclosure).

In some implementations of the cyclic core variance system/method of the present disclosure, the transition zone TZ may be required to modify the launch condition of a given optical signal, or otherwise passively process the signal, during its passage through the transition. This can be accomplished by means of lens (refractive) and mirror (reflective) elements, which themselves are merely step changes in the core region's index of refraction, shaped to perform the intended optical function. These optical functions can be performed within the transition zone TZ at least three different ways: (i) discretely—by a single major lens/mirror element located within the transition zone TZ, or at one end of it; (ii) progressively—by a series of minor lens/mirror elements dispersed along the length of the transition zone TZ; or (iii) continuously—where the whole transition zone TZ has a three-dimensional graded index profile which performs the required optical function(s). In theory, any of these three methods could be employed for any given device, but as a practical matter, the technical, performance, and cost requirements of a particular device will generally tend to make one option clearly preferable to the other two.

Figure 5:
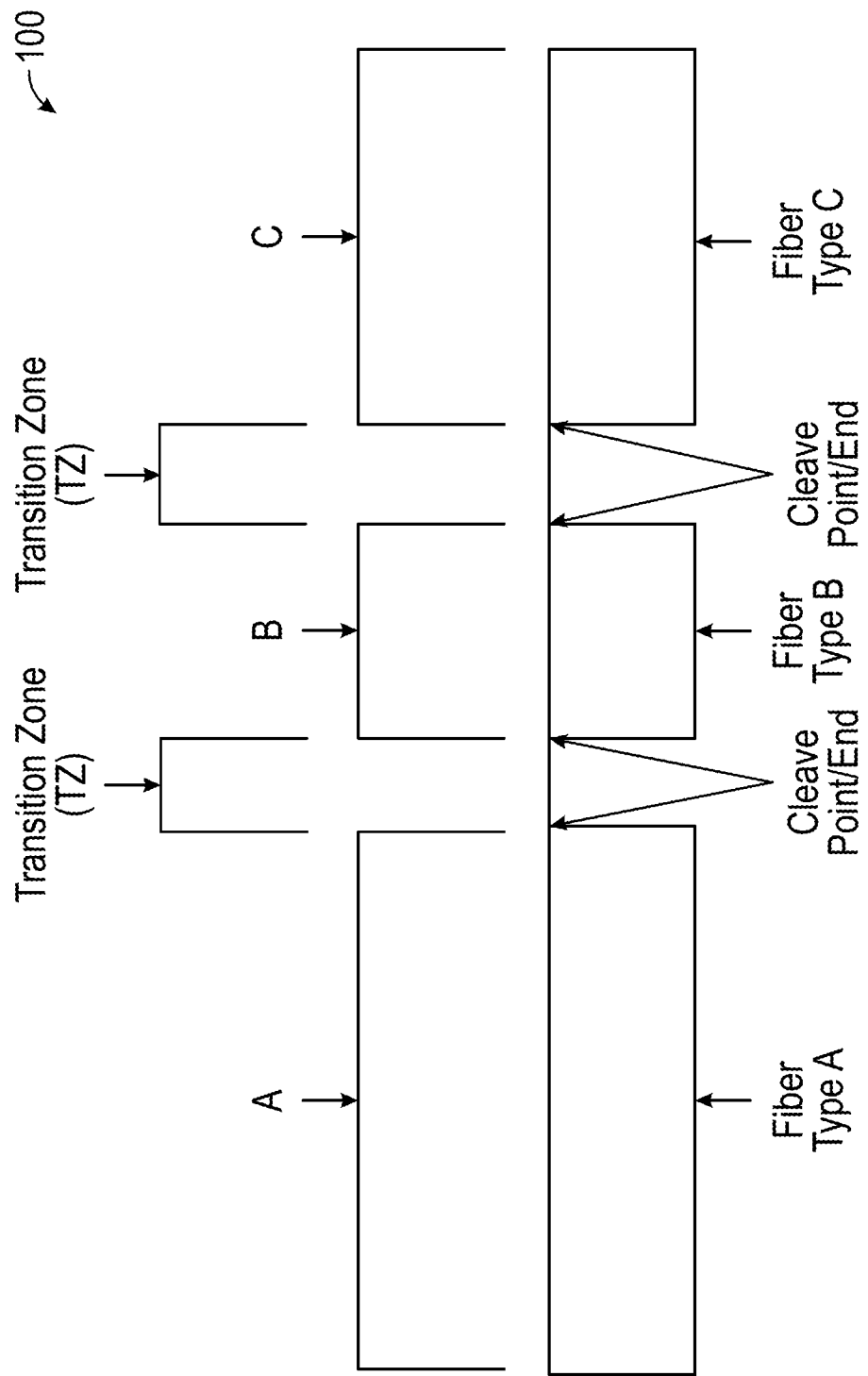
FIG. 5 is a schematic of an exemplary optical fiber with sequential varying core profile zones.

FIG. 5 is a schematic of an exemplary optical fiber 100 with sequential varying core profile zones according to the present disclosure. As noted above, convention optical fiber (both glass and plastic optical fiber) is produced using a constant core profile embedded within a cladding. Instead of having one constant core profile of the optical fiber, the core profile of the optical fiber 100 can be varied sequentially between two or more different core profile zones along the length of the optical fiber. The number of different core profile zones and the length of each core profile zone can be customized based on the needs of the end user. In particular, rather than a cyclical variation of the same two core profile zones having the same length (as illustrated in FIG. 1), the core profile zones of the optical fiber 100 can be of any diameter and/or length as requested by the end user.

As illustrated in FIG. 5, the optical fiber 100 can include different core profile zones A, B, C that each define respective fiber types A, B, C. Three core profile zones A, B, C are shown in FIG. 5, although the optical fiber 100 could be produced with a greater number of different profile zones. The fiber types A, B, C can include cores of different diameters, single cores, and/or multiple cores. As an example, FIG. 5 illustrates fiber type A as dimensioned longer than fiber types B and C, and fiber types A and C dimensioned longer than fiber type B. It should be understood that any customized length of the respective fiber types could be used.

The optical fiber 100 includes transition zones TZ between the core profile zones A and B, and the core profile zones B and C. The transition zones TZ begin and end at the respective ends of the core profile zones A, B, C. After fabrication, the optical fiber 100 can be cleaved at the ends of the transition zones TZ to allow for separation and use of the customized core profile zones A, B, C. Each of the core profile zones A, B, C can include a single core. In some embodiments, one or more cores of the core profile zones A, B, C can be multi-core (e.g., two or more cores), with continuously formed transitions between the single and multi-core zones at the transition zones TZ. Each of the cores of the core profile zones A, B, C can be substantially concentrically positioned relative to a uniform cladding. In some embodiments, one or more of the cores of the core profile zones A, B, C can be offset from the central longitudinal axis of the optical fiber 100 (e.g., non-concentric core), with continuously formed transitions between the concentric and non-concentric cores at the transition zones TZ.

Thus, irregular sequential production of differing core index profiles can be fabricated to form the optical fiber 100 using a continuous drawing process. The optical fiber 100 allows production of multiple different specialty fibers in a single run, greatly reducing the cost and minimum order requirements of such fibers. The optical fiber 100 production also provides the ability to produce multiple experimental fiber configurations into a single run, dramatically reducing the research and development effort required to develop and perfect new types of optical fibers. Production of specialty fibers for commercial use and/or research and development can thereby become affordable, and the production time for such specialty fibers can be significantly reduced.

Figure 6:
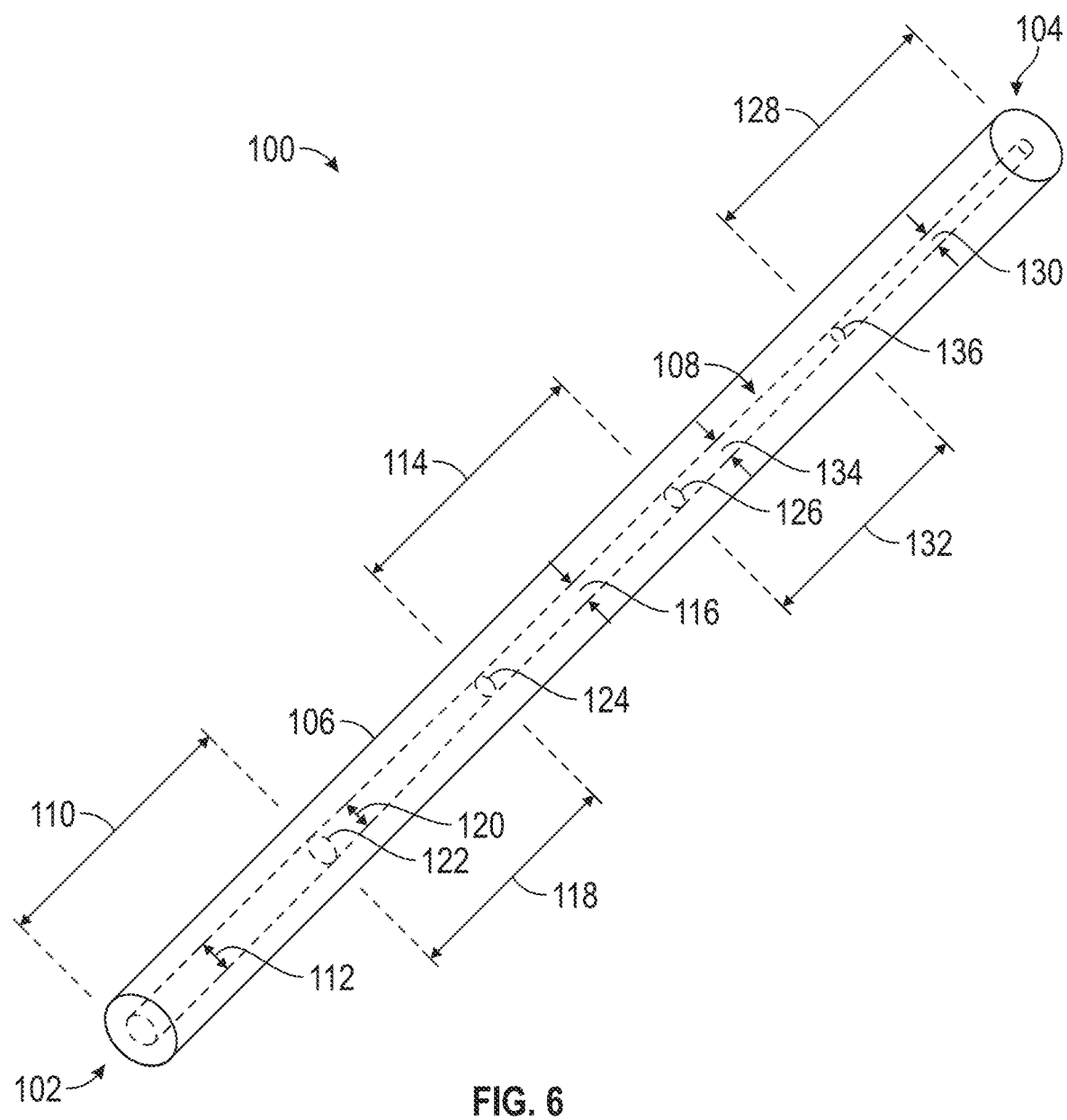
FIG. 6 is a side perspective view of an exemplary optical fiber with sequential varying core profile zones.

FIG. 6 is a schematic of the exemplary optical fiber 100 with sequential varying core profile zones. As described herein, the optical fiber 100 can be fabricated as a continuous, single optical fiber having two or more different core profile zone diameters separated by transition zones. The length of each discrete core index profile can be fabricated based on the needs of the end user such that the optical fiber 100 can be cleaved by the end user at the connection between the transition zone and the core index profile before use. Multiple core index profile diameters of the desired length can thereby be provided in a single, continuous run of optical fiber to accommodate the user's needs.

The optical fiber 100 can be similar to the adapter link 10 of FIG. 2A, FIG. 2B, FIG. 2C and FIG. 2D. However, rather than being cyclically formed with repeating core diameters DA and DB separated by precisely formed transition zones, the optical fiber 100 can include discrete core index profile diameters separated by transition zones that do not necessitate precision in formation. In particular, rather than serving a functional purpose, the transition zones merely serve an operational purpose to physically connect the different core index profile zones. The optical fiber 100 can include two different core index profile zones, or two or more different core index profile zones depending on the production requirements of the end user. The location of the transition zones can be irregular and/or uncontrolled depending on the desired lengths of each of the respective core index profile zones. The ability to produce the irregular core profile zones continuously allows for different optical fiber types to be produced in a single, continuous run, significantly reducing the overall production time typically needed for such specialty optical fiber fabrication.

The optical fiber 100 includes a proximal end 102 and a distal end 104 on opposing sides of the optical fiber 100. The optical fiber 100 includes a cladding 106 surrounding a core 108. The core 108 is substantially continuously drawn such that the core 108 defines a single, continuous core extending between the proximal and distal ends 102, 104. The optical fiber 100 includes a first core profile zone 110 with a first core diameter 112, and a second core profile zone 114 with a second core diameter 114. The first core profile zone 110 is connected to the second core profile zone 114 by a first transition zone 118 having a first transition diameter 120.

The first core diameter 112 defines a substantially uniform diameter between the proximal end 102 and a first endpoint 122. The second core diameter 116 defines a substantially uniform diameter between a second endpoint 124 and a third endpoint 126. The first core diameter 112 is dimensioned different from the second core diameter 116. The first transition diameter 120 gradually tapers from the first endpoint 122 having a diameter substantially equal to the first core diameter 112 to the second endpoint 124 having a diameter substantially equal to the second core diameter 116.

The gradual taper at the transition zone can be controlled during the drawing process to ensure a smooth transition between differing first and second core diameters 112, 116, preventing breakage that can normally occur at abrupt changes in diameter. However, the transition zone need not be extensive in length and only serves to connect the different diameters 112, 116 without considering performance issues at the transition zone. Specifically, in use, the transition zones are cleaved and discarded, and thereby do not affect performance of the optical fiber 100 at the individual and respective profile zones 110, 114, 128. Rather than being relied upon to transmit a signal without significant loss between the respective profile zones 110, 114, 128, the transition zones merely connect the profile zones 110, 114, 128 during production and can be cleaved as needed when the optical fibers formed by the profile zones 110, 114, 128 are ready to be independently used.

The optical fiber 100 can be formed with multiple different core diameters. For example, the optical fiber 100 can include a third core profile zone 128 with a third core diameter 130, and a second transition zone 132 having a second transition diameter 134 can connect the second core profile zone 114 to the third core profile zone 128. The third core diameter 130 defines a substantially uniform diameter between the third endpoint 126 and a fourth endpoint 136. The third core diameter 130 is dimensioned different from the first and second core diameters 112, 116. The second transition diameter 134 gradually tapers from the third endpoint 126 having a diameter substantially equal to the second core diameter 116 to the fourth endpoint 136 having a diameter substantially equal to the third core diameter 130.

The dimensions of the first, second and third core diameters 112, 116, 130 can be selected based on the needs of the end user and can be in any combination. For example, in some embodiments, the first core diameter 112 can be dimensioned greater than the second and third core diameters 116, 130. In some embodiments, the second core diameter 116 can be dimensioned greater than the first and third core diameters 112, 130. In some embodiments, the third core diameter 130 can be dimensioned greater than the first and second core diameters 112, 116.

The length of each of the first, second and third core profile zones 110, 114, 128 can be selected and fabricated based on the needs of the user. In some embodiments, the length of the core profile zones 110, 114, 128 can be substantially equal. In some embodiments, the length of at least one of the core profile zones 110, 114, 128 can be different from the remaining core profile zones 110, 114, 128. In some embodiments, each of the core profile zones 110, 114, 128 can be of a different length. The optical fiber 100 can therefore be fabricated in a customized manner to accommodate the needs of the end user. Although the core profile zones 110, 114, 128 can define different lengths and/or diameters, the entire length of the optical fiber 100 is fabricated as a single, continuous fiber (e.g., a fiber in which the core is continuous and not spliced).

The optical fiber 100 can be fabricated using three-dimensional (3D) printing techniques to form a composite preform produced to concatenate a series of different specialty fibers into a single preform to be produced sequentially concatenated in a single, continuous fiber draw. The fabrication process can be used to either produce a continuously fiber draw having different core profile zone diameters for a single customer, or combined to draw different core profile zone diameters for multiple customers. Several different specialty customers can thereby combine their respective production requirements into a single production run of standard length, greatly reducing the cost barriers to specialty fiber production.

Figure 7:
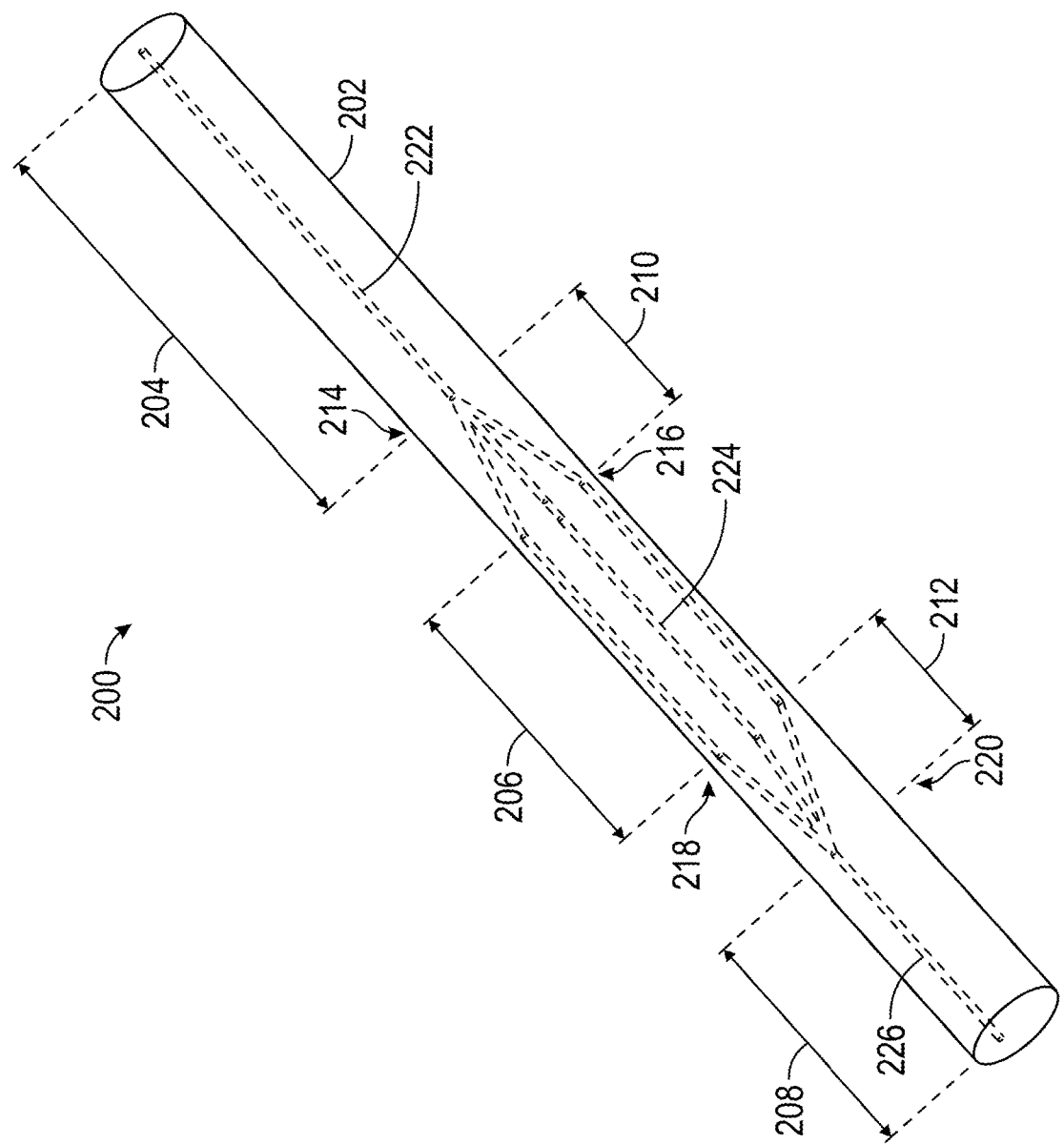
FIG. 7 is a side perspective view of another exemplary optical fiber with sequential varying core profile zones.

FIG. 7 is a schematic of an exemplary optical fiber 200 having sequential varying core profile zones. The optical fiber 200 can be substantially similar to the optical fiber 100 of FIGS. 5 and 6, except for the distinctions noted here. The optical fiber 200 includes a cladding 202, sequentially formed and potentially different core profile zones 204, 206, 208, and transition zones 210, 212. Cleaving points 214, 216 can be located on either end of the transition zone 210, and cleaving points 218, 220 can be located on either end of the transition zone 212.

The optical fiber 200 can be produced to include different types of cores. One core type can be a single core 222 concentrically positioned relative to the cladding 202, as illustrated in core profile zone 204. One core type can be a multi-core 224, as illustrated in core profile zone 206. One core type can be an offset or non-concentrically positioned core 226 relative to the cladding 202, as illustrated in core profile zone 206. The different core types can gradually transition at the transition zones 210, 212, and can be produced as needed depending on the type of optical fibers desired by the user. The non-concentric positioning of the core could be used in the single and multi-core type embodiments. In some instances, such non-concentric fabrication can be used, e.g., as a security feature to increase the difficulty in tapping a particular optical line, to accommodate an off-center location for a photodetector on a printed circuit board, for specific sensor applications, for extending the evanescent field of propagating light into the outside of the cladding for the purpose of sensing and/or coupling, for creating unbalanced scenarios due to circular non-symmetrical cladding, for easier side polishing as less material needs to be removed from the side that the core is closer to outside of the cladding, or the like.

In some embodiments, one or more of the core profile zones 202, 204, 206 can be fabricated to have differing functional purposes (e.g., polarization-maintaining) for the core(s) within the respective core profile zones 202, 204, 206. For example, if the as-drawn optical fiber has longitudinally-varying functions, one section can include a certain level of a polarization-maintaining feature. In some embodiments, such polarization-maintaining feature can be achieved by shaping the core into an elliptical (as compared to a perfectly round) cross-sectional shape, or by adding two or several stress applying parts into the cladding area around the core.

Figure 8:
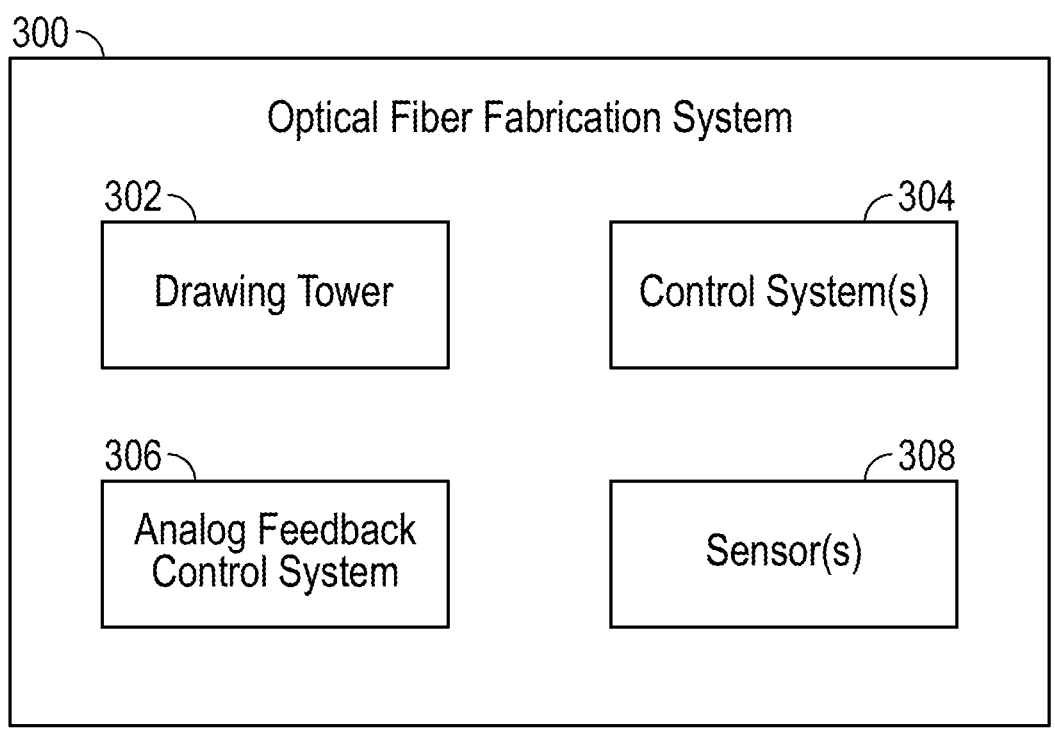
FIG. 8 is a block diagram of an exemplary optical fiber fabrication system for fabrication of the optical fibers of FIGS. 5-7.

FIG. 8 is a block diagram of an exemplary optical fiber fabrication system 300 for fabrication of the optical fibers 100, 200 of FIGS. 5-7. The system 300 can include a drawing tower 302, one or more control systems 304, an analog feedback control system 306, and one or more sensors 308. The system 300 can include additional elements, such as one or more furnaces, one or more temperature sensors, one or more controllers, one or more draw tension fiber coating applicators, one or more take-up systems, In some embodiments, the sensors 308 can include force/motion detectors, such as an accelerometer, that would detect the change in local viscosity associated with the transition zone which would, in turn, provide feedback to the control system to ramp the draw speed up or down to ensure the drawn fiber's cladding diameter remains effectively constant. The transitions can be irregular and can be detected and accommodated by active sensing and speed control, respectively. As such, the system 300 can include a variety of sensor and control components that can assist with real-time (or substantially real-time). In some embodiments, the analog feedback control system 306 can be incorporated into the control systems 306. The systems 304, 306 and sensors 308 can be in communication with each other and can detect conditions and/or characteristic of the drawing process at the drawing tower 302.

As noted above, the core index profile of the optical fiber 100, 200 changes from one longitudinal section of the optical fiber 100, 200 to the next. The optical form of the transition zone between one core profile zone and the next need not be controlled, and instead is cut away by the end user or after the production run is complete. Generally, it may not be practicable to have a zero-length transition between the different core profile zones. For example, given a constant preform temperature, the glass in the differing core profile zones may have different local viscosities, thereby necessitating different draw speeds in order to maintain a constant cladding diameter. Thus, as the draw reaches a transition zone, a sharp transition could result in possible fiber mechanical strength degradation due to the sudden step change in local viscosity.

However, a gradual change in local viscosity can be managed continuously by the control system(s) 304 used during fabrication. Sensors 308 within the drawing tower 302 (and in communication with the control systems 304, 306) can be used to detect the start of the transition zone and, once detected, the draw speed can be ramped up or down and the furnace temperature and gas flow can be adjusted using the analog feedback control system 306, or in accordance with a specially-designed control program. Upon reaching the next core profile zone, the draw speed can be substantially uniformly maintained at the desired level to achieve the desired diameter of the core profile zone. A periodic variation of the drawing speed can therefore be used to achieve the optical fiber 100, 200 with different core profile zone diameters and/or different core types. It should be understood that the cladding outer diameter remains substantially uniform between the proximal and distal ends of the optical fiber 100, 200, and the inner diameter of the opening within the cladding can vary to accommodate and appropriately surround the different core profile zones. In one example, the sensors 308 can be configured to detect the drawing tension of the drawn fiber, which can vary with viscosity. Such sensor 308 can be based on detecting the resonant vibrational frequency of the drawn fiber. The drawing tension can be determined by finding the fundamental resonant frequency (e.g., using one or more additional sensors). The detection results can be provided to the control systems 304, 306 to adjust, e.g., the fiber drawing speed, the furnace temperature, the gas flow within the furnace, additional furnace/drawing parameters, combinations thereof, or the like, to accommodate the difference. The adjustment can be performed in real-time or substantially real-time to ensure accuracy of the drawing process. The controlled adjustment can thereby efficiently maintain a smooth transition of drawing tension between adjacent, distinctively different core profile zones.

The fabrication process described herein can be used in the fiber optic installation industry, as well as the fiber optic research and development industry. Differing formulations and changes to core index profiles can, through the noted method, be sequentially produced within a single preform. Differing formulations can be incorporated into a single preform using a variety of steps. In some embodiments, the sequentially varying core index profiles in a single preform can be achieved by controlling the deposition of the soot layer during MCVD process. Since the deposition of soot layer is highly dependent on temperature distributions inside the MCVD substrate tube, different index profiles are established as one controls the transverse length, speed and ambient temperature of heating torch(es) or element(s) during preform manufacturing.

In some embodiments, the differing formulations can be encoded into the MCVD substrate by varying the tube thickness along the length. The tube thickness variation can translate into a temperature distribution variation during preform manufacturing, causing the core index to change longitudinally in accordance with the encoded thickness profile of the substrate. In some embodiments, use of a dummy substrate to selectively block the soot layer deposition onto the MCVD substrate can be used, similar to the photo-resistance layer used in the semiconductor manufacturing industry. The process can be repeated multiple times until a desired differing formulation is built into a single preform. In some embodiments, sections from different preforms that have differing core profiles can be fused together to form a new preform. In some embodiments, manipulations of the thermal profiles during the sintering process, as well as geometry modification and collapsing post-processes, can be used. It should be understood that the methods discussed herein are merely provided as examples and the specification should not be limited to such examples.

There are a variety of advantages to the manufacturing process discussed herein. For example, if an optical design engineer needs to run a 3×3 full factorial design of experiments on a particular fiber design, with conventional technology, this would necessitate 27 different preforms and an equal number of fiber draws in order to obtain the needed experimental data. However, using method discussed herein, all 27 experimental profiles could be concatenated into a single draw, shortening the experimental production time by a factor of 27, reducing the production cost of experimental samples by the same factor, and greatly reducing the amount of surplus/scrap material left at the end of the experiment. The exemplary method thereby accelerates the rate at which new optical fiber technologies are developed and validated, while at the same time dramatically reducing the costs required to do so.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method of fabricating an optical fiber, comprising:
    fabricating an optical fiber, the optical fiber defining a longitudinal length having a proximal end and a distal end, the optical fiber including:
    (i) a first core profile zone defining a first core diameter, the first core profile zone defining a first core longitudinal length dimensioned greater than zero;
    (ii) a second core profile zone defining a second core diameter different from the first core diameter, the second core profile zone defining a second core longitudinal length dimensioned greater than zero;
    (iii) a first transition zone connecting the first core profile zone to the second core profile zone, the first transition zone defining a first transition zone longitudinal length dimensioned greater than zero;
    (iv) a third core profile zone defining a third core diameter different from the first and second core diameters, the third core profile zone defining a third core longitudinal length dimensioned greater than zero; and
    (v) a second transition zone connecting the second core profile zone to the third core profile zone, the second transition zone defining a second transition zone longitudinal length dimensioned greater than zero;
    wherein the first core profile zone, the second core profile zone, the first transition zone, the third core profile zone, and the second transition zone are formed as a single, continuous fiber;
    wherein the first core diameter of the first core profile zone defines a first constant core profile along the first core longitudinal length;
    wherein the second core diameter of the second core profile zone defines a second constant core profile along the second core longitudinal length;
    wherein the third core diameter of the third core profile zone defines a third constant core profile along the third core longitudinal length; and
    wherein an outer diameter of the optical fiber remains constant along an entire length of the optical fiber.

2. The method of claim 1, wherein the optical fiber includes a cladding disposed around the first core profile zone, the second core profile zone, the first transition zone, the third core profile zone, and the second transition zone.

3. The method of claim 2, wherein the cladding defines the outer diameter between the proximal and distal ends of the optical fiber.

4. The method of claim 1, wherein the optical fiber is a glass optical fiber or a plastic optical fiber.

5. The method of claim 1, wherein the first transition zone includes a first transition zone core diameter that tapers from the first core diameter of the first core profile zone to a second transition zone core diameter at the second core diameter of the second core profile zone, and wherein the second transition zone includes a second transition zone core diameter that tapers from the second core diameter of the second core profile zone to a third transition zone core diameter at the third core diameter of the third core profile zone.

6. The method of claim 1, wherein the first core longitudinal length of the first core profile zone is dimensioned different than the second core longitudinal length of the second core profile zone.

7. The method of claim 1, wherein the third core longitudinal length of the third core profile zone is dimensioned different than the first and second core longitudinal lengths of the first and second core profile zones, respectively.

8. The method of claim 1, wherein the first transition zone longitudinal length of the first transition zone is dimensioned different than a second transition zone longitudinal length of the second transition zone.

9. The method of claim 1, wherein the optical fiber includes a third core profile zone, the first core profile zone including includes a single core and the third core profile zone including includes two or more cores.

10. The method of claim 1, wherein the first core profile zone includes a core concentrically positioned relative to a central longitudinal axis of the optical fiber, and the second core profile zone includes a core non-concentrically positioned relative to the central longitudinal axis of the optical fiber.

11. The method of claim 1, wherein the first core profile zone includes a core with a first polarization-maintaining level, and the second core profile zone includes a core with a second polarization-maintaining level different from the first polarization-maintaining level.

12. The method of claim 1, wherein the first transition zone is fabricated to provide a gradual taper and transition between the first core profile zone and the second core profile zone for physical connectivity of the first core profile zone and the second core profile zone without consideration of optical transmission performance along the first transition zone.

13. The method of claim 1, comprising cleaving the optical fiber at or near ends of the first transition zone.

14. An optical fiber, comprising:
    an optical fiber core extending a longitudinal length between a proximal end and a distal end, the optical fiber core including:
    (i) a first core profile zone defining a first core diameter, the first core profile zone defining a first core longitudinal length dimensioned greater than zero;

(ii) a second core profile zone defining a second core diameter different from the first core diameter, the second core profile zone defining a second core longitudinal length dimensioned greater than zero;

(iii) a first transition zone connecting the first core profile zone to the second core profile zone, the first transition zone defining a first transition zone longitudinal length dimensioned greater than zero;

(iv) a third core profile zone defining a third core diameter different from the first and second core diameters, the third core profile zone defining a third core longitudinal length dimensioned greater than zero; and (v) a second transition zone connecting the second core profile zone to the third core profile zone, the second transition zone defining a second transition zone longitudinal length dimensioned greater than zero;

wherein the first core profile zone, the second core profile zone, and the first transition zone, the third core profile zone, and the second transition zone define a single, continuous fiber;

wherein the first core diameter of the first core profile zone defines a first constant core profile along the first core longitudinal length;

wherein the second core diameter of the second core profile zone defines a second constant core profile along the second core longitudinal length;

wherein the third core diameter of the third core profile zone defines a third constant core profile along the third core longitudinal length; and wherein an outer diameter of the optical fiber remains constant along an entire length of the optical fiber.

15. The optical fiber of claim 14, comprising a cladding disposed around the first core profile zone, the second core profile zone, and the first transition zone, the third core profile zone, and the second transition zone.

16. The optical fiber of claim 15, wherein the cladding defines the outer diameter between the proximal and distal ends of the optical fiber.

17. The optical fiber of claim 14, wherein the first transition zone includes a first transition zone core diameter that tapers from the first core diameter of the first core profile zone to a second transition zone core diameter at the second core diameter of the second core profile zone.

18. The optical fiber of claim 14, wherein the first core longitudinal length of the first core profile zone is dimensioned different than the second core longitudinal length of the second core profile zone.

19. An optical fiber, comprising:

an optical fiber core extending a longitudinal length between a proximal end and a distal end, the optical fiber core including:

(i) a first core profile zone defining a first core diameter, the first core profile zone defining a first core longitudinal length dimensioned greater than zero;

(ii) a second core profile zone defining a second core diameter different from the first core diameter, the second core profile zone defining a second core longitudinal length dimensioned greater than zero;

(iii) a first transition zone connecting the first core profile zone to the second core profile zone, the first transition zone defining a first transition zone longitudinal length dimensioned greater than zero;

(iv) a third core profile zone defining a third core diameter different from the first and second core diameters, the third core profile zone defining a third core longitudinal length dimensioned greater than zero; and (v) a second transition zone connecting the second core profile zone to the third core profile zone, the second transition zone defining a second transition zone longitudinal length dimensioned greater than zero; and a cladding disposed around the first core profile zone, the second core profile zone, the third core profile zone, the first transition zone, and the second transition zone;

wherein the first core profile zone, the second core profile zone, the third core profile zone, the first transition zone, and the second transition zone define a single, continuous fiber;

wherein the first core diameter of the first core profile zone defines a first constant core profile along the first core longitudinal length;

wherein the second core diameter of the second core profile zone defines a second constant core profile along the second core longitudinal length;

wherein the third core diameter of the third core profile zone defines a third constant core profile along the third core longitudinal length; and wherein an outer diameter of the optical fiber remains constant along an entire length of the optical fiber.

* * * * *